United States Patent [19]

Vaseen

[11] 4,317,044
[45] Feb. 23, 1982

[54] OZONE PRODUCTION APPARATUS

[75] Inventor: Vesper A. Vaseen, Wheatridge, Colo.

[73] Assignee: Robert Dougan Construction Co., Denver, Colo.

[21] Appl. No.: 44,963

[22] Filed: Jun. 4, 1979

Related U.S. Application Data

[63] Continuation-in-part of Ser. No. 885,956, Mar. 13, 1978, Pat. No. 4,182,663.

[51] Int. Cl.³ ............................................. C01B 13/10
[52] U.S. Cl. ................................ 422/186.3; 204/176; 204/157.1 R
[58] Field of Search .............. 204/157.1 R, 176; 422/22, 23, 186; 250/527

[56] References Cited

U.S. PATENT DOCUMENTS

| | | | |
|---|---|---|---|
| 3,628,010 | 12/1971 | Tarkoey | 250/527 |
| 3,993,911 | 11/1976 | Graentzel | 250/527 |
| 4,124,467 | 11/1978 | Pincon | 250/527 |
| 4,140,608 | 2/1979 | Vaseen | 204/176 |

*Primary Examiner*—Deborah L. Kyle

[57] ABSTRACT

Ozone is produced when oxygen dissolved or absorbed in an inert liquid dielectric is irradiated with ultra violet (light) energy in the wave length range between 1100 and 2200 angstrom units. The apparatus wherein oxygen gas or air or mixtures thereof, converts a percentage of the oxygen to ozone is composed of special ultra violet 1100 to 2200 angstrom wave length transmitting glass or plastic liquid retainer structural material for the selected inert dielectric liquid used as the absorber liquid for the oxygen, air and ozone gases. The configurations for construction of the apparatus are adinfinitum as flat parallel sheets, paired-corrugated sheets, concentric tubes, etc., any of which control the thickness of the dielectric liquid passing by the source of irradiation.

3 Claims, 3 Drawing Figures

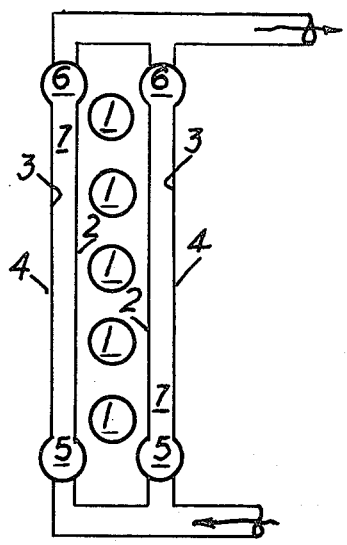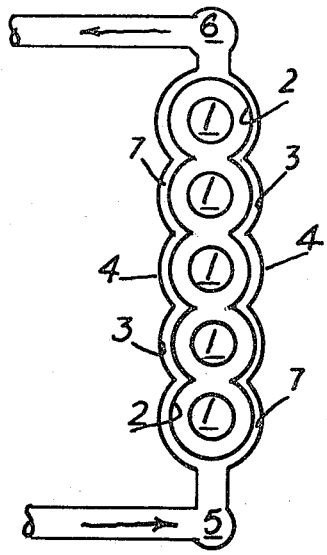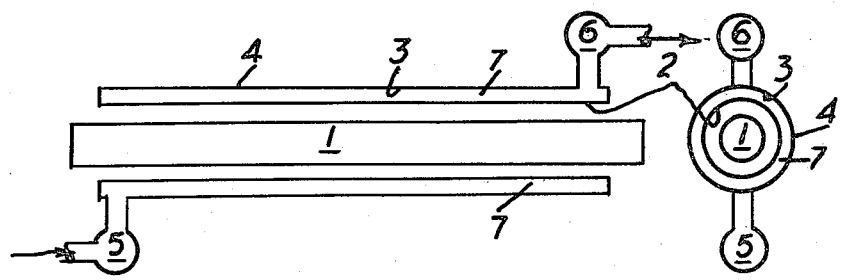

OZONE PRODUCTION APPARATUS

This application is a C-I-P of Ser. No. 885,956, 3-3-78, now U.S. Pat. No. 4,182,663.

Ozone gas production has heretofore been only by conversion of gaseous oxygen or oxygen in air to ozone by the use of a silent electrical discharge called a corona, or by ultra violet light energy exiting the oxygen ($O_2$) to temporarily form ozone ($O_3$).

Exiting of oxygen dissolved or absorbed in an inert dielectric liquid has also been found to convert the oxygen to ozone, which as absorbed or dissolved in the dielectric liquid retains its integrity as ozone up to a 3 day half life.

The apparatus in which oxygen is converted to ozone while both the oxygen and the resultant ozone is absorbed in the dielectric liquid is the disclosure herewith.

HISTORICAL AND DESCRIPTION OF PRIOR ART

Ozone as a gas has been manufactured where and when needed; obtained by the action of strong electrostatic discharges in air, oxygen or a mixture of both. The reaction is immediately reversible; that is, $3O_2 \rightleftharpoons 2O_3$; with no more than 6% of the mixture actually converted to temporary ozone. U.S. Pat. No. 4,140,608 issued Feb. 20, 1979 disclosed a method of producing ozone in excess of 10% with up to a 30 day half life by causing a high voltage "corona" across a liquid dielectric containing absorbed or dissolved oxygen or air, or both. Patent application U.S. Pat. No. 885,956 now U.S. Pat. No. 4,182,663 filed 03/13/78 further discloses the process of producing ozone in excess of 10% with up to a 3 day half life by irradiating a liquid dielectric containing absorbed or dissolved oxygen or air or both.

Ozone ($O_3$) is a three-atom allotrope of oxygen. It is a normal, though rare, gaseous constituent of the earth's atmosphere. Ozone has a molecular weight of 48, compared to oxygen, 32 and air, 29. Ozone was first known and recognized by its delicate, sweet odor at low concentrations; indeed the word ozone comes from the Greek "ozein" which means "to smell". Scientific discovery of ozone and earliest investigation of its characteristics is attributed to Schoenbein. Although considerable further research has been accomplished since that time, it has only been during the past two decades that the significance of ozone, both as an environmental factor and chemical oxidant, has been cogently recognized.

Prior to U.S. Pat. No. 4,140,608 and disclosure patent application 885,956; ozone generators have been of three general types.

Silent arc discharge or corona type generators have been predominantly used where large quantities of ozone were required. The silent arc discharge generator is essentially an alternating voltage applied across two electrodes separated by a dielectric insulated gap. Silent arc discharge generators transform most of the input electrical energy into heat. Ozone yield of a silent arc discharge generator is a function of oxygen purity of the parent gas, oxygen or gas temperature, pressure, flow, peak voltage, frequency, capacitance of discharge gap, capacity of dielectric and gap dimensions. Contamination of the parent gas by water vapor markedly decreased ozone generation efficiency.

The quartz/mercury arc and other types of ultra violet activated generator types have been used most commonly where low ozone concentrations were required; such as air purification, laboratory experimentation, and ozone environment experimental chambers. Generators employing oxygen as the parent gas typically produced ozone where irradiated in the range of 1100 to 2200 A° angstrom of one milligram per hour.

Ozone has been generated by the electrolysis of water; however, due to the high current densities required at the anode, ozone yield is severely influenced by thermal destruction. This process has not had commercial application.

Approximately 90% of electrical energy supplied to an ozonator is at present with gases types systems, wasted as heat. It takes about 20 W to produce one (1) gram of ozone as ($O_3$) when using 60 cycle current, of which 3 to 4 watts are used to drive auxiliary equipment which conditions the air.

REFERENCES

U.S. Pat. Nos. 1,074,106—9/1913 Dumars 204/176, 2,992,540—7/1961 Grosse et. al. 62/48, 3,186,930—6/1965 Cook 204/176, 3,342,721—9/1967 Dibelius, et. al. 250/531, 3,766,051—10/1973 Bollyky 250/540, 4,140,608—2/1979 Vaseen 204/176.

U.S. patent application Ser. No. 885,956 03/13/78 Vaseen.

BRIEF DESCRIPTION OF THE DRAWINGS

FIG. I shows one embodiment of the present invention in which the reference numerals correspond to the following structures:
 1—Ultra violet energy source
 2—U.V. transparent glass or similar material
 3—U.V. transparent glass or similar material
 4—U.V. reflective surface
 5—Influent manifold
 6—Effluent manifold
 7—Parallel (liquid volume) space between flat surfaces FIG. II shows a second embodiment of the present invention in which the reference numerals correspond to the following structures:
 1—Ultra violet energy source
 2—U.V. transparent glass or similar material
 3—U.V. transparent glass or similar material
 4—U.V. reflective surface
 5—Influent manifold
 6—Effluent manifold
 7—Parallel (liquid volume) space between corrugated surfaces FIG. III shows a third embodiment of the present invention in which the reference numerals correspond to the following structures:
 1—Ultra violet energy source
 2—U.V. transparent glass or similar material
 3—U.S. transparent glass or similar material
 4—U.V. reflective surface
 5—Influent manifold
 6—Effluent manifold
 7—Parallel (liquid volume) space between concentric tubes

SUMMARY

The invention consists of the apparatus which confines the flow of an inert dielectric liquid through it in a manner which controls the exposure time and thickness of the liquid through which are caused to pass ultra violet energy in the range of 1100 to 2200 angstrom wave lengths thus energizing the absorbed oxygen atoms and molecules dissolved in the liquid partially to the ozone or $O_3$ state.

Three basic configurations are illustrated to teach the art and science of constructing such apparatus. These three basic configurations are illustrated by way of example and deviation from these illustrations is possible by way of many configurations, but does not depart from the spirit of the basic apparatus.

The simplest configuration (FIG. 1) consists of an ultra violet light source (1) preferably elongated tubes, which radiate wavelengths from 1100 to 2200 angstrom through an adjacent glass plate (2) selected for its passing ultra violet energy with wavelengths of 1100 to 2200 angstrom. Efficiency of design indicates a pair of glass plates on each side of the tubes (1) is better than on just one side, even with use of a reflector on one side. Preferably, parallel to the ultra violet transparent sheet (3) adjacent to an ultra violet reflective surface (4) or the reflective surface which also acts as the inert liquid retainer. An influent manifold (5) is used to disperse the dielectric liquid, pregnant with oxygen evenly throughout (7) the length preferably (90° (degrees) to the U.V. Tubes), of the apparatus. An effluent manifold (6) is used to collect the irradiated dielectric liquid containing preferably in excess of 10 percent actual ozone.

Although the illustration has been made by way of passing the dielectric at 90 degrees to the length of the U.V. energy tubes, the angle can range at the designers choice from 90° to 180° (or parallel) with the manifold thus revolved 90°.

An alternative to the parallel plate configuration is FIG. II which illustrates a parallel corrugated configuration. An ultra violet energy source (1), preferably elongated tubes extending the full width of the apparatus. Said ultra violet energy waves ranging from 1100 to 2200 angstrom. Parallel to the circumferences of the elongated U.V. energy tubes is constructed a pair (2)(3) of corrugated ultra violet, in the range of 1100 to 2200 angstrom wave length, transparent sheets of glass or satisfactory material, through which (7) the inert dielectric liquid now pregnant with absorbed or dissolved oxygen as inserted at influent manifold (5) flows in a thin sheet between the parallel configuration while being irradiated.

The outside sheet (3) is either a reflective material or is a reflective material (4) mounted adjacent to the U.V. transparent glass (3), reflecting back on the dielectric liquid flowing in a thin film, several mm, through the parallel voids between the parallel corrugated sheets. The fully irradiated dielectric liquid now carrying absorbed, preferably not less then 10% ozone as $O_3$ is collected at the effluent manifold (6) where it is transported to point of use.

Another alternative configuration is FIG. III, which illustrates a pair of concentric glass tubes (2)(3) also parallel to the U.V. energy tube (1) circumference. The ultra violet energy source of 1100 to 2200 angstrom wave length is preferably the full length of the pair of concentric U.V. transparent tubes. Preferably the exterior retention tube (3) is U.V. transparent glass with a U.V. reflective exterior surface (4) or is entirely of a reflective material.

The dielectric liquid pregnant with absorbed or dissolved oxygen is preferably inserted through an influent manifold (5) and after flowing through the liquid volume space (7) between the concentric tubes, is removed now pregnant with not less than 10% ozone ($O_3$) at an effluent manifold (6) at the opposing end of the concentric tubes from the influent manifold (5).

PREFERRED EMBODIMENT

It is the intention of this invention to teach the art and science of constructing the apparatus within which and through which is produced ozone. The ozone produced by dissolving oxygen gas in an inert carrier liquid and radiating the liquid with ultra violet light, thus converting a percentage of the oxygen to ozone gas also dissolved in the inert carrier liquid.

For example, to produce ozone of at least (10%) ten percent pure ozone $O_3$ and (90%) ninety percent unreacted oxygen; both as dissolved gases in an inert carrier liquid an oxygen supply is established with a capacity preferably of 10 kg per hour, when producing each 1000 grams per hour of desired pure ozone.

An inert oxygen carrier liquid is selected from the numerous liquids available to those versed in the art and science of inert liquids. For example, a fully halogenated hydrocarbon which has a boiling point of 321° C. and complies with the general chemical/physical characteristics specified herein. The ability of the liquid to absorb oxygen and ozone is determined along with the temperature and pressure combination under which the designed system is to operate. For example with a selected operating temperature of 25° C. and ten (10) atmospheres, the circulation of 166.62 kg of the inert carrier liquid through a closed system provides a balanced oxygen/ozone solubility.

Preferably a dissolver vessel not a part of this invention is used to provide the mixing and retention time for most efficient oxygen solubility in the inert carrier liquid. For example a 35 centimeter diameter vessel with an overall vertical height of 832 centimeters is charged with sufficient inert carrier liquid to fill the vessel to a depth of 722 centimeters and provide a retention time of, for example five (5) minutes. During the injection of the inert carrier liquid to the dissolving vessel oxygen is added, preferably through a mixer device such as a venturi injector.

With the mixing vessel filled to its design depth additional inert carrier liquid and gaseous oxygen is continued until the pressure in the mixing vessel reaches, for example, ten (10) atmospheres at the discharge nozzle and control valve just below the maximum liquid level; then oxygen saturated carrier liquid is transferred to the radioactive system.

Surplus oxygen which has not been taken into solution in the dissolver vessel collects over the top of the inert carrier liquid, and is preferably removed by a recirculation pump which reinjects it, in parallel with the nacent oxygen, back into the injector venturi or mixing device charging the inert carrier liquid and oxygen to the dissolver vessel. In this manner, eventually one hundred percent (100%) of all oxygen injected into the system is dissolved in the carrier liquid and thence sent to the radiation system.

The radiation apparatus of which this invention is composed, preferably of high strength, special inert structural material, such as glass which permits a high percentage of the ultra violet waves in the range of 1100 angstrom to 2200 angstrom to pass through it. Preferably any shape configuration is acceptable which will pass a thin film of inert carrier liquid, for example 0.10 cm to 5 cm in thickness through and by the ultra violet light source.

Preferably the ends of all parallel sheets or concentric tubes are sealed in a manner which allows removal for cleaning the interior surfaces as required. Those familiar with the mechanics of seals will have no difficulty designing these removable ends.

The disclosure for this invention is made by way of example using FIG. III as the configuration herewith demonstrated.

For example ten (10); ten (10) centimeter diameter transparent glass tubes are arranged in parallel, each to receive 16.662 kg of the inert carrier liquid in the annular space produced between concentric pairs of tubes. The pairs of concentric tubes with the interior tube having, for example a ten (10) centimeter O.D.; concentrically mounted inside a similar tube with an I.D. of eleven (11) centimeters; produces a liquid film thickness, for example, of 0.50 centimeters.

Mounting of the ten concentric tubes in parallel with a length of liquid travel through the tubes of 150 centimeters provides a retention time, preferably in excess of five seconds, for ultra violet light radiation of the inert carrier liquid. Although the example has discussed concentric tubes, this has been done by way of explanation and in no way limits any other configuration which permits a thin film of carrier liquid be passed by the U.V. light source for the time period designed to convert the percentage of oxygen to ozone desired.

The liquid while in the radiation system is preferably under the same pressure as the inert carrier liquid was when mixed with the oxygen in the dissolver vessel.

The light source can be any radiant source of light which has sufficient intensity and wave length to excite the oxygen atoms and molecules and convert a fraction of them to ozone molecules. Preferably the light source has a great percent of its light with ultra violet wavelengths in the 1100 angstrom to 2200 angstrom range.

Radiant energy is supplied preferably at a rate of not less than 120 kilocalories per mole of oxygen in the system. When the radiation system consists of concentric glass tubes as per this example, the light sources are preferably tube lamps at the centerline of the pair of concentric glass tubes. When other configurations are used to pass the thin film of carrier liquid by the radiant light source, other light source configurations are equally acceptable. Those versed in the field of light and such physical/chemical reactions will have no difficulty in designing many varied type configurations meeting the requirements of efficient radiation with ultra violet radiation for a designed duration of radiation.

Heat generated by ultraviolet and other wavelengths within the carrier liquid in the radiation system, is preferably removed by some cooling means. Those versed with ozone generation will be familiar with the art and science of cooling the radiation system and equipment and methods available. The use of the liquid dielectric has a heat absorptive capacity ranging from 0.20 BTU to 0.30 BTU per pound per degree.

Control of the rate of recirculation of the liquid is a viable heat control system.

The radiated carrier liquid, preferably still under pressure, after leaving the radiation system, now pregnant with ozone is transformed to storage vessels not a part of this invention and/or point of use. Ozone pregnant carrier liquid is preferably stored in pressurized containers with not less than the same pressure as the radiation or ozonation system. Release of pressure on the containers reduces the affinity of the carrier liquid for absorbing and holding the dissolved ozone; thus is the ozone recovered for use in a gaseous state.

Inert carrier liquid, from which the ozone has been stripped by reduction of pressure is recycled to ozone production use.

Thus it may be seen that ozone and combinations of ozone and oxygen may be produced in a compact apparatus by closed circuits thus oxidizing oxygen to ozone in a liquid environment. While the present invention has been described in a certain degree of particularity, it is understood that the present disclosure has been made by way of example and that changes in detail of apparatus structures may be made without departing from the spirit thereof.

What is claimed is:

1. An apparatus for producing ozone comprising means to absorb or dissolve an oxygen containing gas selected from the group consisting of oxygen, air and mixtures thereof in an inert dielectric liquid under superatmospheric pressure to form an oxygen pregnant liquid, a source of ultra-violet radiation having a wavelength between 1100 and 2200 angstrom, transparent conduit means for exposing a stream of said oxygen pregnant liquid as a thin, non-turbulent sheet to said radiation to convert at least a portion of said oxygen to ozone, and means for maintaining superatmospheric pressure throughout the apparatus.

2. The apparatus of claim 1 in which said transparent conduit means is provided with a reflective surface such that radiation passing through the oxygen pregnant liquid is reflected and caused to pass back through the liquid.

3. The apparatus of claim 1 in which said transparent conduit means is formed with a pair of spaced apart substantially parallel walls between which the sheet of oxygen pregnant liquid flows and wherein said walls are in the form of flat plates, corrugated plates or concentric tubes.

* * * * *